US009483221B2

(12) United States Patent
Hayashi

(10) Patent No.: US 9,483,221 B2
(45) Date of Patent: Nov. 1, 2016

(54) INFORMATION PROCESSING APPARATUS, CONTROL METHOD, AND STORAGE MEDIUM FOR ON-DEMAND PRINTING

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/562,239

(22) Filed: Dec. 5, 2014

(65) Prior Publication Data
US 2015/0160904 A1 Jun. 11, 2015

(30) Foreign Application Priority Data
Dec. 10, 2013 (JP) ................................. 2013-255209

(51) Int. Cl.
*G06F 3/12* (2006.01)

(52) U.S. Cl.
CPC ............. *G06F 3/1264* (2013.01); *G06F 3/124* (2013.01); *G06F 3/1215* (2013.01); *G06F 3/1229* (2013.01); *G06F 3/1282* (2013.01); *G06F 3/1288* (2013.01); *G06F 3/1272* (2013.01); *G06F 3/1275* (2013.01); *G06F 2206/1514* (2013.01)

(58) Field of Classification Search
None
See application file for complete search history.

(56) References Cited

U.S. PATENT DOCUMENTS

| 6,727,999 B1* | 4/2004 | Takahashi | G03G 15/6538 270/1.02 |
| 8,289,538 B2* | 10/2012 | Cyman et al. | 358/1.15 |
| 8,836,962 B2* | 9/2014 | Yasui | 358/1.13 |
| 2002/0089684 A1* | 7/2002 | Barry | G03G 13/08 358/1.14 |
| 2004/0109191 A1* | 6/2004 | Ohshima | G06F 3/1208 358/1.13 |
| 2004/0265026 A1* | 12/2004 | Lermant | B41J 11/485 400/76 |
| 2012/0026551 A1* | 2/2012 | Tarumi | 358/1.15 |
| 2012/0033253 A1* | 2/2012 | Mori | 358/1.15 |
| 2012/0176645 A1* | 7/2012 | Saito | 358/1.15 |
| 2012/0200873 A1* | 8/2012 | Mori | 358/1.12 |
| 2014/0368843 A1* | 12/2014 | Hayashi | 358/1.9 |

FOREIGN PATENT DOCUMENTS

JP 2012-38107 A 2/2012

* cited by examiner

*Primary Examiner* — Miya J Cato
(74) *Attorney, Agent, or Firm* — Canon U.S.A., Inc. IP Division

(57) ABSTRACT

An information processing apparatus generates, in a case where first component data and second component data for forming a product are received, one composite job based on the first component data and the second component data, a first component job based on the first component data, and a second component job based on the second component data.

9 Claims, 20 Drawing Sheets

FIG. 3

```
<PrintTalk>
 <Request>
   <PurchaseOrder BusinessID="12345" RequestDate="2012-12-14"> ~300
     <JDF >
       <ResourcePool>
         <CustomerInfo ID="Cus001">
           <Contact ID="Con001">
             <Person FirstName="June" LastName="Jones"/>
             <Address Street="1745 First Street" City="Dublin" Region="OH" PostalCode="43202"/>
           </Contact>
         </CustomerInfo>                                                              }301
         <DeliveryIntent>
           <Method Preferred="UPS"/>
           <DropIntent>
             <Required Preferred="2012-12-24"/>
             <ContactRef rRef="Con001"/>
             <DropItemIntent Amount="1" Unit="500">
               <ComponentRef rRef="Item001"/>
             </DropItemIntent>
           </DropIntent>                                                              }302
         </DeliveryIntent>
                                                                      303
         <Component ID="98765432" CatalogID="12345" DescriptiveName="ProductName"/>
         <JDF DescriptiveName="WraparoundBand">
           <GeneralID IDUsage="Option" IDValue="Dynamic"/>
           <!-- JDF subnode -->
         </JDF>
         <JDF DescriptiveName="Body">
           <ResourcePool>
             <ColorantControl ProcessColorModel="DeviceCMYK"/>
             <!-- JDF subnode -->
           </ResourcePool>
         </JDF>                                                                       }304
         <JDF DescriptiveName="Cover">
           <GeneralID IDUsage="Option" IDValue="Dynamic"/>
           <ResourcePool>
             <ColorantControl ProcessColorModel="DeviceGray"/>
             <!-- JDF subnode -->
           </ResourcePool>
         </JDF>
         <JDF DescriptiveName="Jacket">
           <!-- JDF subnode -->
         </JDF>
       </ResourcePool>
     </JDF>
   </PurchaseOrder>
 </Request>
</PrintTalk>
```

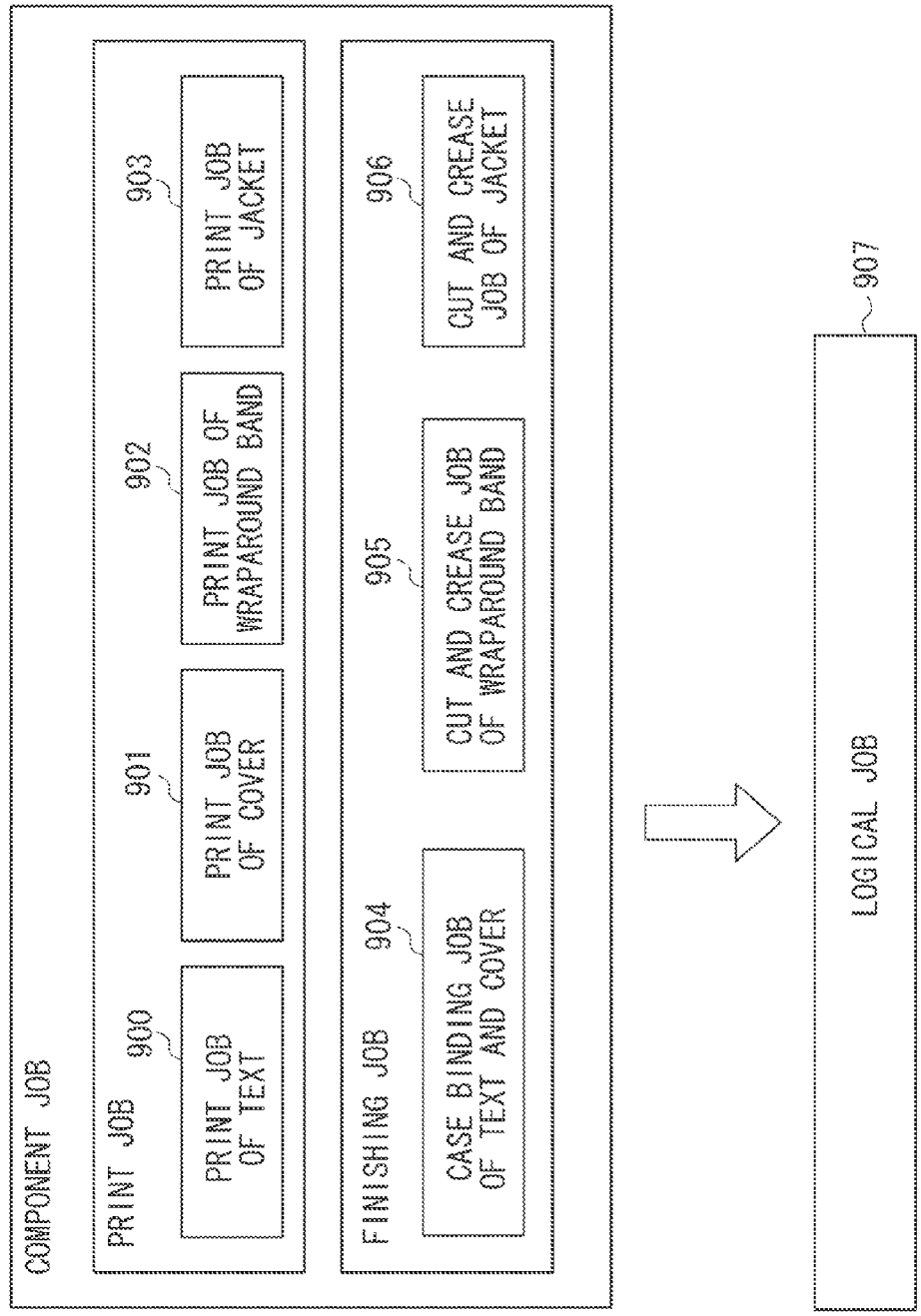

FIG. 10

PRINT JOB OF TEXT                900

```
<JDF>
  <ResourcePool>

<NodeInfo>
      <JobList_Path1> http://1.2.3.4/JobP T.xml</JobList_Path1>   1000
      <JobList_JobType1>PrintingJob</JobList_Job Type1>   1001       1002
      <JobList_DeviceName1> IMAGE FORMING APPARATUS 404</JobList_DeviceName>
      <JobList_Device Type1> ON-DEMAND PRINTING MACHINE</JobList_Device Type1>
      <BookNo>100000-000-000</BookNo>   1004
    </NodeInfo>                                                        1003
  </ResourcePool>
</JDF>
```

CASE BINDING JOB OF TEXT AND COVER        904

```
<JDF>
  <ResourcePool>

<NodeInfo>
      <JobList_Path1> http://1.2.3.5/JobPT.xml</JobList_Path1>   1005
      <JobList_JobType1>FinishingJob</JobList_JobType1>   1006       1007
      <JobList_DeviceName1>POST-PROCESSING APPARATUS 406</JobList_DeviceName1>
      <JobList_DeviceType1>BOOKBINDING MACHINE </JobList_DeviceType1>
      <BookNo>100000-000-000</BookNo>   1009
    </NodeInfo>                                                        1008
  </ResourcePool>
</JDF>
```

CUT AND CREASE JOB OF WRAPAROUND BAND        905

```
<JDF>
  <ResourcePool>

<NodeInfo>
      <JobList_Path1> http://1.2.3.5/JobPT.xml</JobList_Path1>   1010
      <JobList_JobType1>FinishingJob</JobList_JobType1>   1011       1012
      <JobList_DeviceName1>POST-PROCESSING APPARATUS 407</JobList_DeviceName>
      <JobList_DeviceType1> CUTTER AND CREASER </JobList_DeviceType1>
      <BookNo>100000-000-000</BookNo>   1014
    </NodeInfo>                                                        1013
  </ResourcePool>
</JDF>
```

FIG. 14

```xml
<?xml version="1.0"encoding="UTF=8"?>
<Settings>
  <LogicalDeviceList>  1401
    <LogicalDevice LogicalDeviceName="LOGICAL DEVICE A"/>  1402
    <LogicalDevice LogicalDeviceName="LOGICAL DEVICE B"/>  1403
      <Device DeviceType="ON-DEMAND PRINTING MACHINE">IMAGE FORMING APPARATUS 404</Device>  1404
      <Device DeviceType="BOOKBINDING MACHINE">POST-PROCESSING APPARATUS 406</Device>  1405
    </LogicalDevice>
  </LogicalDeviceList>
  <PhysicalDeviceList>  1406
1407  <PhysicalDevice DeviceType=>"ON-DEMAND PRINTING MACHINE">IMAGE FORMING APPARATUS 404</PhysicalDevice>
1408  <PhysicalDevice DeviceType=>"ON-DEMAND PRINTING MACHINE">IMAGE FORMING APPARATUS 405</PhysicalDevice>
1409  <PhysicalDevice DeviceType=>"BOOKBINDING MACHINE">POST-PROCESSING APPARATUS 406</PhysicalDevice>
      <PhysicalDevice DeviceType=>"CUTTER AND CREASER">POST-PROCESSING APPARATUS 407</PhysicalDevice>  1410
  </PhysicalDeviceList>
</Settings>
```

1400

INFORMATION PROCESSING APPARATUS, CONTROL METHOD, AND STORAGE MEDIUM FOR ON-DEMAND PRINTING

BACKGROUND OF THE INVENTION

1. Field of the Invention

The present invention relates to an information processing apparatus and a method for implementing efficiency of work from generation to output of printing and finishing jobs in on-demand printing, for example.

2. Description of the Related Art

In recent years, on-demand printing has been realized by improvement in a printing technique through digitization of receiving an order via the Internet and an image forming apparatus. In a production site of the on-demand printing, efficient production is required for an order of a product, for example, a photobook, a photo album, a manual or the like, including one or more components, such as a cover and a text.

Japanese Patent Application Laid-Open No. 2012-38107 discusses a technique in which a job including a printing instruction and a binding instruction is generated from an uploaded order, and the generated job is output to an image forming apparatus and a post-processing apparatus, for work efficiency from job generation to job output. Japanese Patent Application Laid-Open No. 2012-38107 discusses a technique in which a job is generated from the uploaded order for each of components included in a product, the product including one or more components.

However, in Japanese Patent Application Laid-Open No. 2012-38107, device selection and a job output operation are required for each jobs for a plurality of components when one or more devices are used to generate a product. This may result in an increase of operation load.

SUMMARY OF THE INVENTION

According to an aspect of the present invention, an information processing apparatus includes a receiving unit configured to receive first component data and second component data for forming a product, and a generation unit configured to generate a composite job based on the first component data and the second component data, a first component job based on the first component data, and a second component job based on the second component data.

Further features of the present invention will become apparent from the following description of exemplary embodiments with reference to the attached drawings.

BRIEF DESCRIPTION OF THE DRAWINGS

FIG. 3 is a diagram illustrating an example of order information.

FIG. 9 is a diagram illustrating a relationship among components, a component job, and a logical job.

FIG. 10 is a diagram illustrating an example of a component job.

FIG. 14 is a diagram illustrating an example of a setting file of an output destination device.

DESCRIPTION OF THE EMBODIMENTS

Various exemplary embodiments, features, and aspects of the invention will be described in detail below with reference to the drawings.

Figure 1:
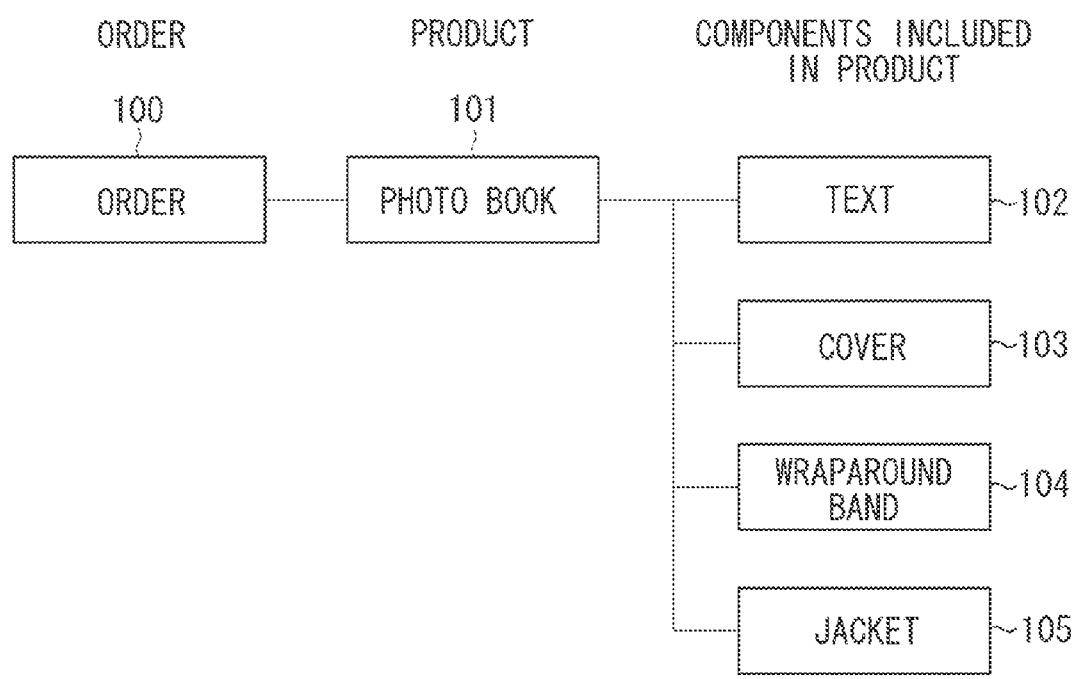
FIG. 1 is a diagram illustrating a relationship among an order, a product, and components.

FIG. 1 is a block diagram illustrating a relationship among an order, a product, and components according to an exemplary embodiment. An order 100 includes at least one product or more. According to the present embodiment, a photobook 101 is assumed as the product. The photobook 101 includes at least one component or more. According to the present exemplary embodiment, the photobook 101 includes components which are a text 102, a cover 103, a wraparound band 104, and a jacket 105. A Portable Document Format (hereinafter referred to as PDF) is uploaded as a content of the component, and image data is arranged in the PDF.

For example, the order 100 may include at least a description indicating that the order 100 is an order and information (order information) for specifying a product. The information for specifying the product includes a content of the product including designation of an image and a layout, and the types and the number of components. According to the order information, the product, i.e., the photobook 101 in an example of the order 100, is specified, and the components can also be specified. In an example illustrated in FIG. 1, the components are the text 102, the cover 103, the wraparound band 104, and the jacket 105 according to the content of the order 100. An image printed on each of the components is also specified according to the order 100.

Figure 2:
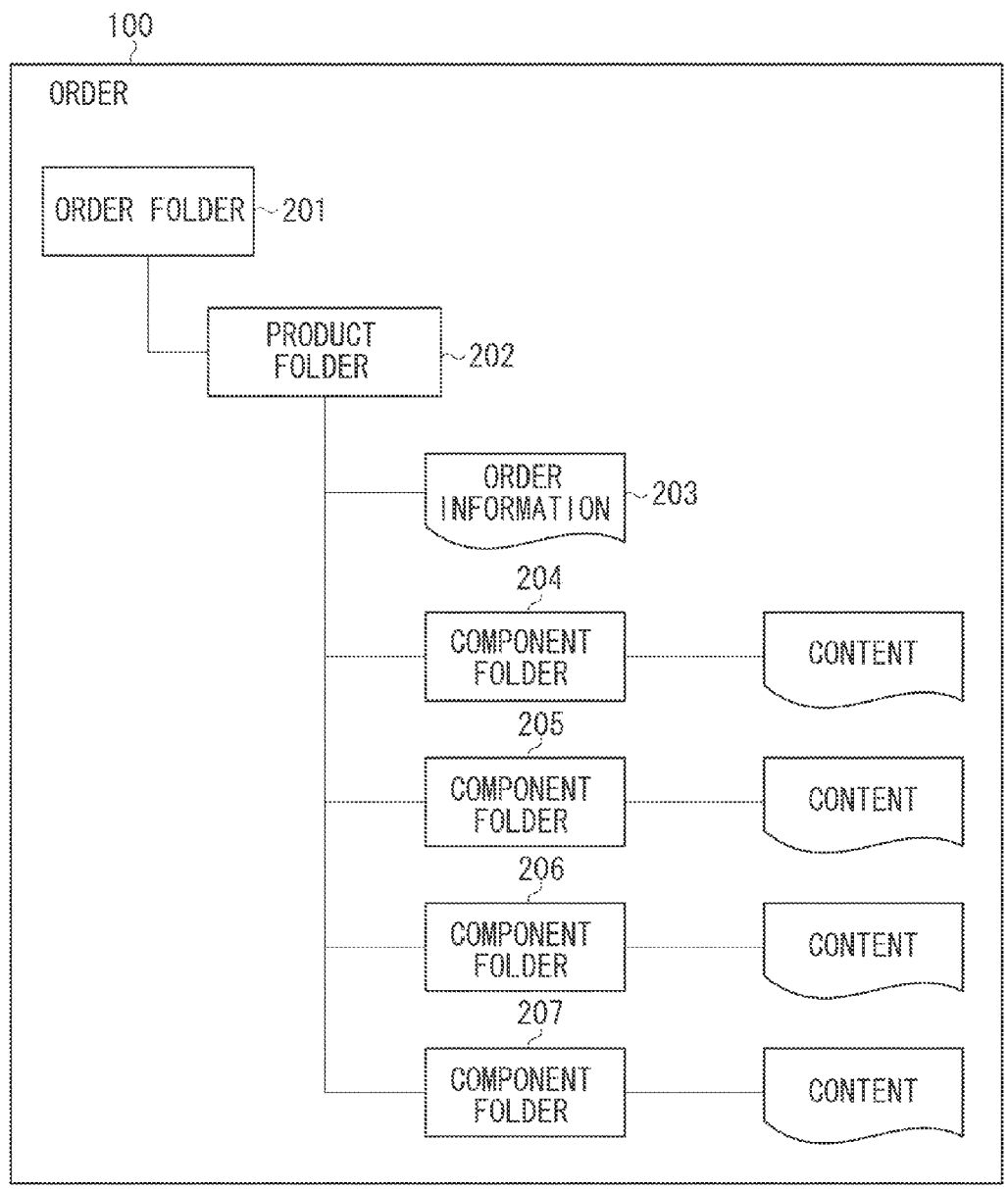
FIG. 2 is a diagram illustrating an example of an order.

FIG. 2 is a diagram illustrating an example of the order 100 according to the present exemplary embodiment. The order 100 sent from an order server via the Internet has a folder configuration illustrated in FIG. 2. A product folder 202 is provided just below an order folder 201 being a top-level folder. Order information 203 indicating an option setting and a component configuration, a purchaser, and a delivery destination of a product and component folders 204 to 207 is provided just below the product folder 202. A PDF is stored in each of the component folders 204 to 207 as a content of component data, and image data is arranged in the PDF.

FIG. 3 is a diagram illustrating an example of the order information 203 according to the present exemplary embodiment.

In the example illustrated in FIG. 3, the order information 203 includes order detail information 300 indicating an order number and an order date. The order detail information 300 includes purchaser information 301, a delivery method 302, product information 303 indicating a product number, a product name, and a product type number, and component information 304. A product and a component can be specified according to the order detail information 300. "Component ID" indicates the product number, "CatalogID" indicates the product type number, and "DescriptiveName" indicates the product name.

Figure 4:
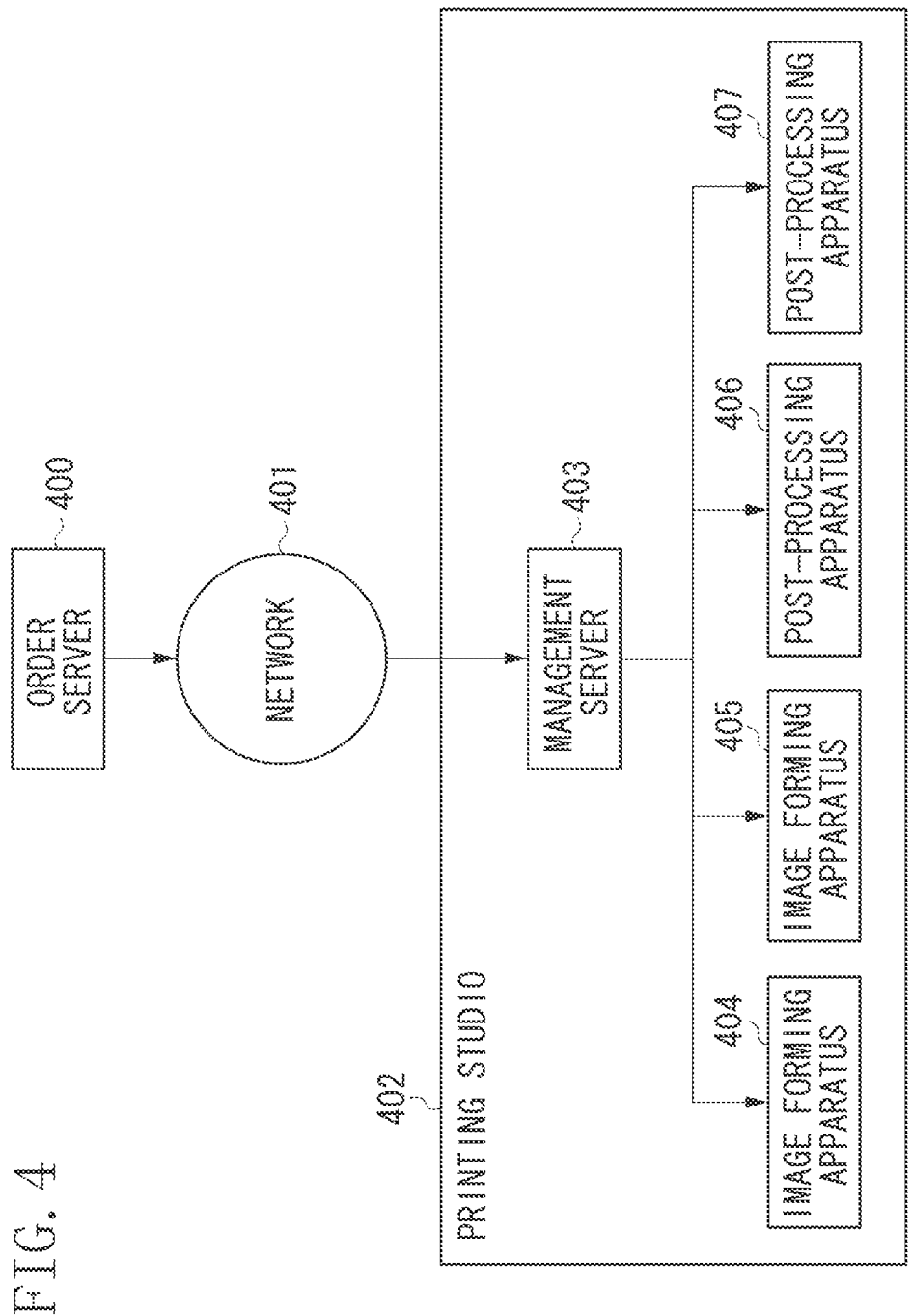
FIG. 4 is a diagram illustrating a network configuration of an information processing system.

FIG. 4 is a diagram illustrating a network configuration of an information processing system according to the present exemplary embodiment. As illustrated in FIG. 4, in the network configuration of the information processing system according to the present exemplary embodiment, an order server 400 and a printing studio 402 are connected to each other to realize communication via a network 401, such as a wide area network (WAN).

The order server 400 is a server computer functioning as an uploading system via a web. If the photobook 101 in the example illustrated in FIG. 1 is purchased via the web, for example, a customer starts a web browser from home, and accesses a web site provided by the order server 400. The customer selects a desired product, uploads a picture required to produce the product to the order server 400, pays a presented amount, and orders the photobook 101. The order corresponds to the order 100, and order information for specifying the product and components included in the order 100 is the order information 203.

The printing studio 402 includes a management server 403, and an image forming apparatus 404, an image forming apparatus 405, a post-processing apparatus 406, and a post-processing apparatus 407. The post-processing apparatuses 406 and 407 may be or may not be connected to a local area network (LAN). According to the present exemplary embodiment, the post-processing apparatuses 406 and 407 are connected to the LAN.

The management server 403 receives the order 100 issued from the order server 400, and generates a work flow indicating processes for producing the product according to the received order information 203. The management server 403 manages printing by the image forming apparatuses 404 and 405 and post-processing by the post-processing apparatuses 406 and 407. Each of the image forming apparatuses 404 and 405 is connected to the management server 403, and executes, among the processes included in the work flow generated by the management server 403, the printing process, i.e., a print job, to print components included in a print product which is the product. For post-processing, finishing jobs are also output from the management sever 403 as the processes included in the work flow and the product on which the finishing jobs is to be executed is output to each of the post-processing apparatuses 406 and 407.

Figure 5:
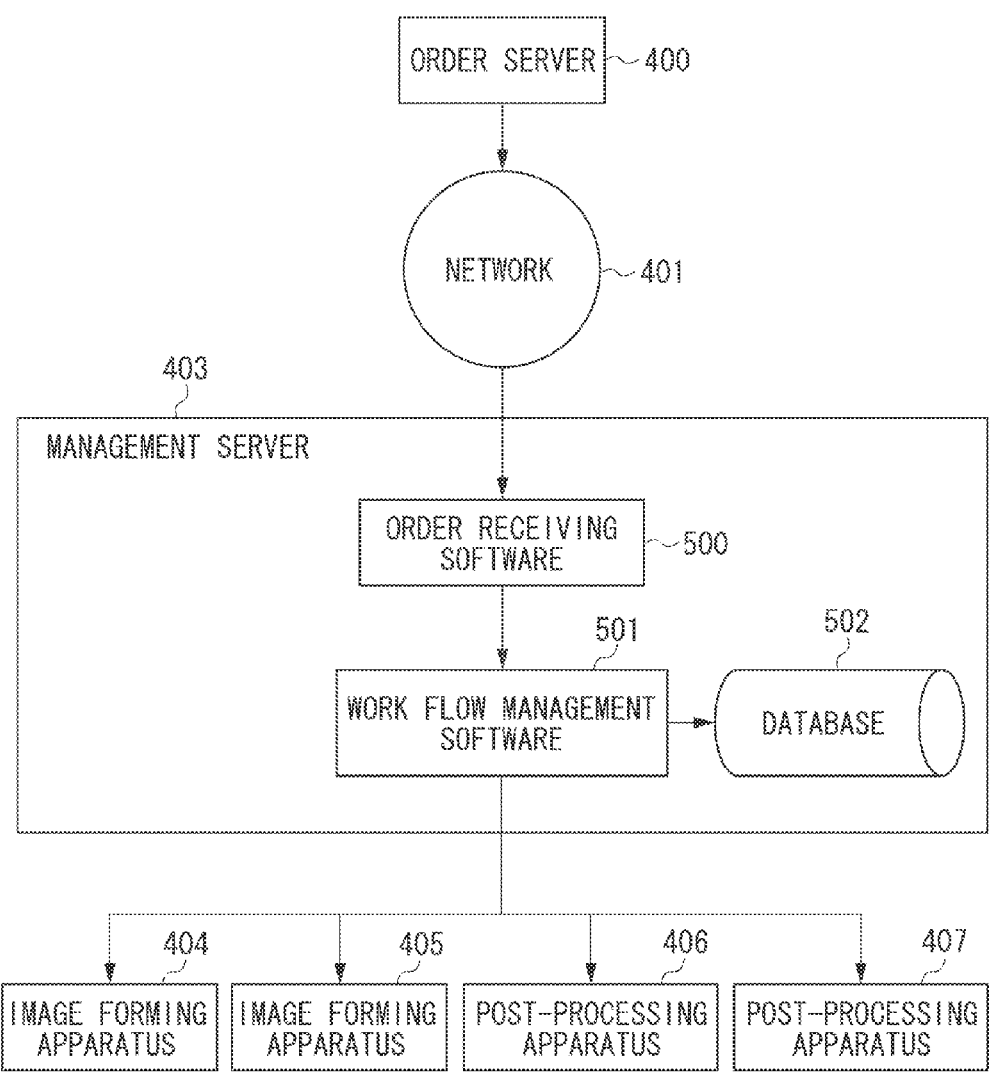
FIG. 5 is a diagram illustrating a configuration of a management server.

FIG. 5 is a block diagram illustrating a configuration of the management server 403 according to the present exemplary embodiment. Order receiving software 500 for receiving an order from the order server 400 via the network 401 is installed in the management server 403. Further, work flow management software 501 for outputting a job relating to the received order to the image forming apparatus 404, the image forming apparatus 405, the post-processing apparatus 406, and the post-processing apparatus 407 is installed in the management server 403. The management server 403 includes a database 502 storing received order information and content data. According to the present exemplary embodiment, the software is synonymous with a program.

The work flow management software 501 registers, when receiving the order from the order receiving software 500, data of the order in the database 502, and further performs prepress processing, job generation processing, and job output processing for each of the components included in the printed product relating to the order. The work flow management software 501 performs image correction processing as the prepress processing for an image arranged in content data of each of the components included in the printed product. The work flow management software 501 further performs PDF layout processing to the content data of each of the components included in the printed product for adding a register mark to be used for cutting processing and a barcode to be used for an inspection. The work flow management software 501 generates a component job for each of the components after the prepress processing, and outputs the generated component job to the image forming apparatus 404, the image forming apparatus 405, the post-processing apparatus 406, and the post-processing apparatus 407.

Figure 6:
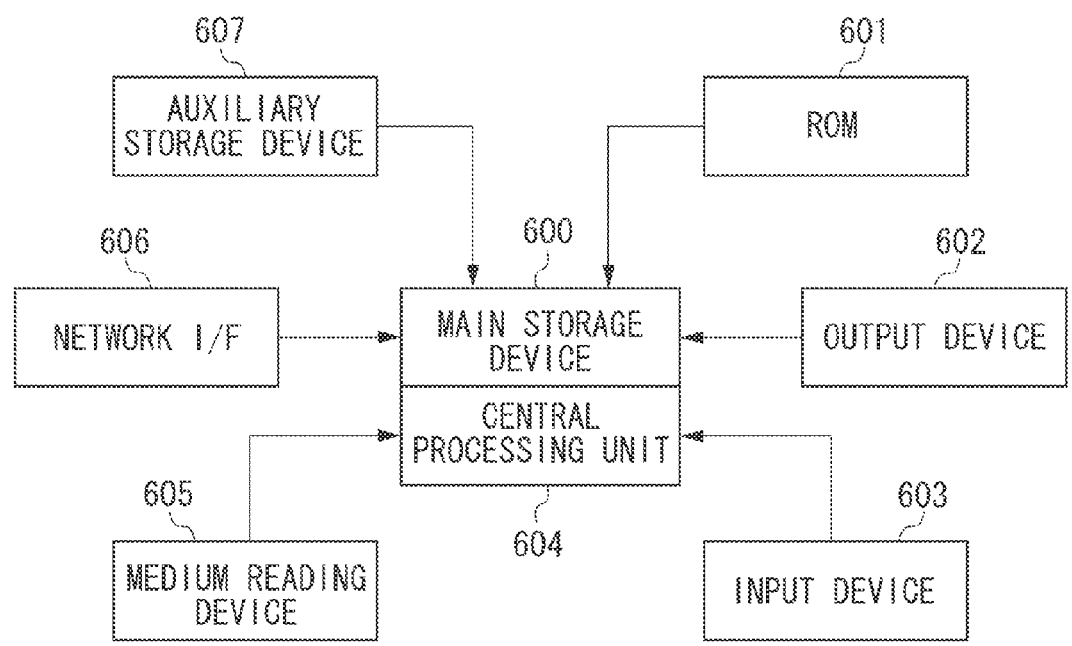
FIG. 6 is a diagram illustrating a hardware configuration of the management server.

FIG. 6 is a block diagram illustrating a hardware configuration of the management server 403 according to the present exemplary embodiment. In FIG. 6, a central processing unit 604 reads programs, such as the order receiving software 500 and the work flow management software 501, and related data from a storage medium, such as a compact disk read only memory (CD-ROM), an integrated circuit (IC) memory card, or the like, via a medium reading device 605. Alternatively, the central processing unit 604 receives the programs and the related data via the network 401, and stores the received program and related data in an auxiliary storage device 607, such as a hard disk. Then, the central processing unit 604 executes an application program loaded from the auxiliary storage device 607 into a main storage device 600, and processes information input from an input device 603. As a result, the component job is output to the image forming apparatus 404, the image forming apparatus 405, the post-processing apparatus 406, and the post-processing apparatus 407 via an output device 602 and a network interface (I/F) 606. According to the present exemplary embodiment, the output device 602 is a display device, such as a display, and is distinguished from the image forming apparatus 404 and the image forming apparatus 405 which are originally included in an output device. The input device 603 includes a keyboard, a pointing device, and the like. A procedure illustrated in a flowchart to be described below is stored in any of the main storage device 600, the auxiliary storage device 607, and a read-only memory (ROM) 601 in the management server 403, and is generally executed after being replicated onto the main storage device 600 by the central processing unit 604.

Further, the auxiliary storage device 607 may include a hard disk or a magneto-optical disk, or may be a combination of the hard disk and the magneto-optical disk. The present invention is not restricted even if devices included in the auxiliary storage device 607 are connected to each other via a network.

Figure 7:
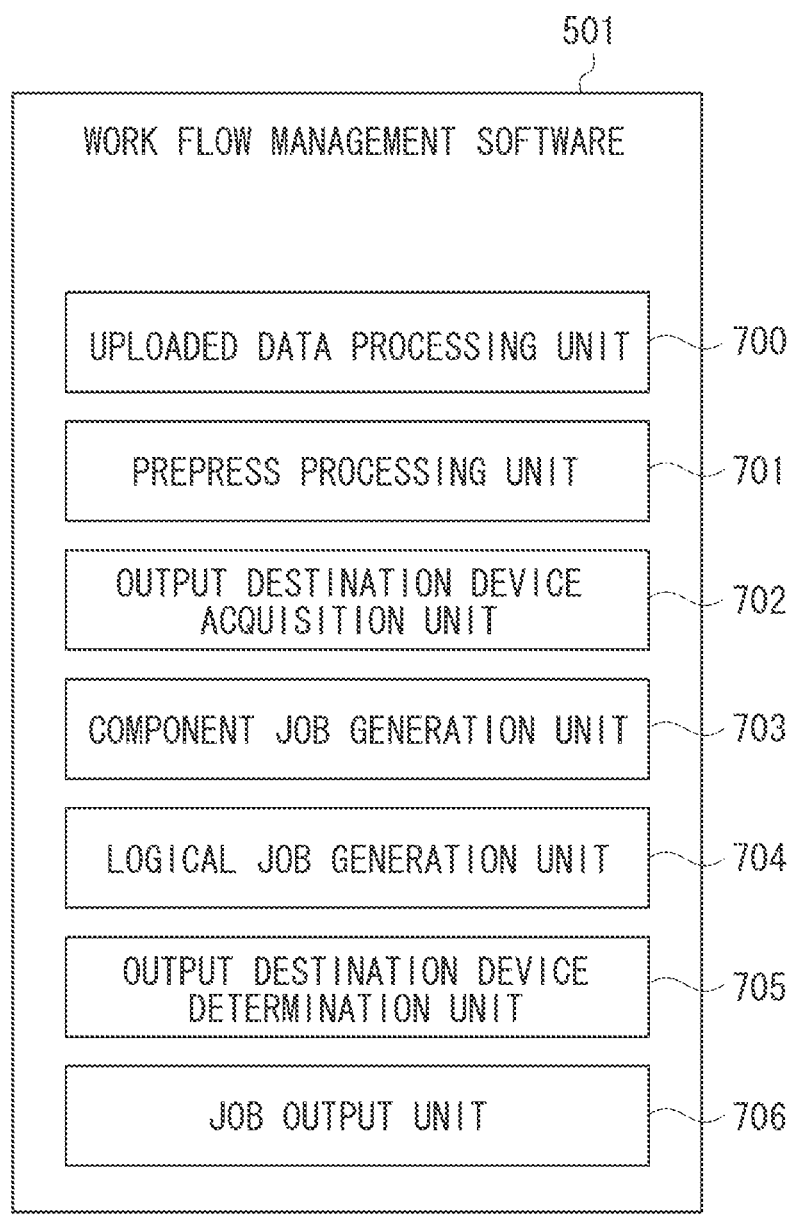
FIG. 7 is a diagram illustrating a software configuration of the management server.

FIG. 7 is a diagram illustrating the work flow management software 501 according to the present exemplary embodiment of the present invention. FIG. 7 is a diagram illustrating a feature of processing according to the present exemplary embodiment.

In FIG. 7, the work flow management software 501 includes an uploaded data processing unit 700, and a prepress processing unit 701, an output destination device acquisition unit 702, a component job generation unit 703, a logical job generation unit 704, an output destination device determination unit 705, and a job output unit 706. Each of the units 700 to 706 represents a functional block implemented when the central processing unit 604 executes the work flow management software 501, and can also be referred to as a unit that implements its function.

The uploaded data processing unit 700 registers, when receiving an order from the order receiving software 500, order information as information for specifying a product and contents in the database 502. For example, in the example illustrated in FIG. 1, when receiving the order information of the order 100, the uploaded data processing unit 700 specifies the photobook 101 from the order information, and further specifies the text 102, the cover, 103, the wraparound band 104, and the jacket 105 which are the components included in the photobook 101. The uploaded data processing unit 700 registers the specified photobook 101 and each of the components relating to the photobook 101 in the database 502. The uploaded data processing unit 700 also registers an order number and an order date included in order information and specification information of the product when registering an order received. Further, a product number is issued to each of products, and the product is also stored in the database 502 together with the product number.

The prepress processing unit 701 performs prepress processing (specifically, image correction processing and PDF layout processing) for each of contents of the components registered by the uploaded data processing unit 700. According to the present exemplary embodiment, the product number issued by the uploaded data processing unit 700 is embedded as a barcode in image data during the PDF layout processing by the prepress processing unit 701. Thus, it can be reliably assured that the text 102 and the cover 103 are components included in the same product by reading the barcode and performing collation, when post-processes (e.g., a case binding process) are performed on the text 102 and the cover 103. Further, a post-processing machine can acquire a product number by reading the barcode printed on a print product using a barcode reader or a sensor and can specify a job ticket for post-processing by searching job tickets indicating the same product number. Thus, when the product is post-processed, time and labor required to search for the job ticket on a panel of the post-processing machine can be saved.

The output destination device acquisition unit 702 acquires a name and a model name of an output destination device to be described in a job. An acquisition source of the output destination device is a print Management Information System (MIS) in printing industries. When the print MIS is used, a production schedule having a print job and a finishing job assigned to each of the devices operating in the printing studio 402 can be generated. The output destination device acquisition unit 702 can acquire the production schedule from the print MIS and specify the output destination devices for the print job and the finishing job from the production schedule. Alternatively, the device name and the model name to be used for producing the product may be described in a setting file, and the output destination devices for each of the print job and the finishing job for producing the product may be specified based on the setting file. The acquisition source does not restrict the present invention. According to the present exemplary embodiment, the output destination device is acquired from the setting file.

The component job generation unit 703 generates a component job for each of the components registered by the uploaded data processing unit 700. The component job means a print job to be output to the image forming apparatus and a finishing job to be output to the post-processing apparatus. More specifically, the component job generation unit 703 describes the output destination devices acquired by the output destination device acquisition unit 702 in the print job and the finishing job and acquires print setting and post-processing setting associated with processes stored in the database 502. The component job generation unit 703 then generates the print job and the finishing job for each of the components registered by the uploaded data processing unit 700. The component job generation unit 703 stores the generated print job and finishing job in the database 502. The product number is described in each of the generated component jobs to be linked to the product. The product number generated by the uploaded data processing unit 700 is used.

Figure 8:
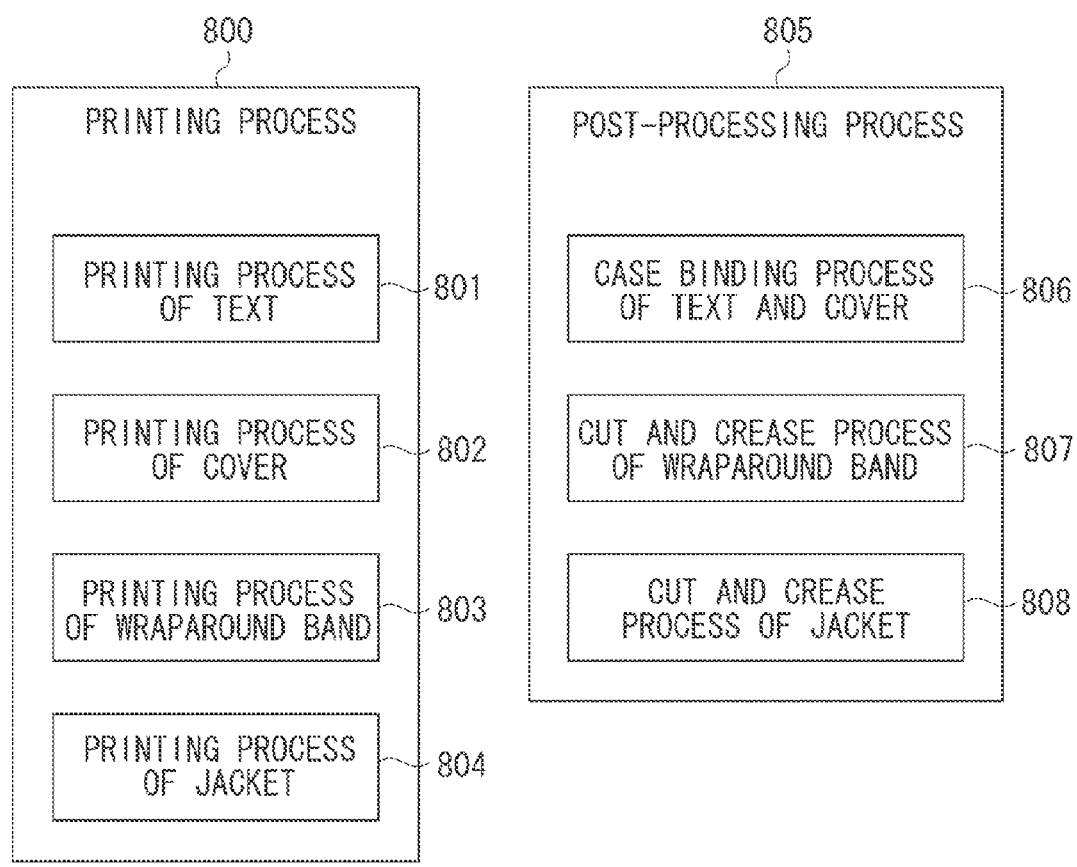
FIG. 8 is a diagram illustrating an example of manufacturing processes of a photobook.

Processes for producing the product are previously defined for each product type in the work flow management software 501, and print setting and post-processing setting are stored therein while being linked to each of the processes. The defined processes are stored in the database 502. The print job and the finishing job are generated according to the processes. For the photobook 101 in the example illustrated in FIG. 1, a printing process 800 includes printing processes 801 to 804 respectively assigned to the text 102, the cover 103, the wraparound band 104, and the jacket 105, as illustrated in FIG. 8. A post-processing process 805 includes a case binding process 806 of the text 102 and the cover 103. Cutting and creasing are performed for the wraparound band 104 and the jacket 105. Thus, cut and crease processes 807 and 808 are respectively assigned to the wraparound band 104 and the jacket 105. The print setting is associated with each of the printing processes 801 to 804, and the post-processing setting is associated with each of the case binding process 806 and the cut and crease processes 807 and 808.

The logical job generation unit 704 generates, for each of the products registered by the uploaded data processing unit 700, one logical job for producing the product. More specifically, after the component job generation unit 703 generates all component jobs of the product, and finishes storing the component jobs in the database 502, the logical job generation unit 704 combines all of the component jobs to generate one logical job, and stores the logical job in the database 502. The product number to be linked to the product is described in the generated logical job. The product number generated by the uploaded data processing unit 700 is used. The logical job may also be referred to as a composite job because it is generated by combining a plurality of component jobs.

The jobs generated by the component job generation unit 703 and the logical job generation unit 704 are displayed on a user interface provided by the work flow management software 501. A user thus can select a job and issue an output instruction.

The output destination device determination unit 705 determines, when the user issues the output instruction for the job selected on the user interface provided by the work flow management software 501, an output destination of the job according to a device designated by the user.

The job output unit 706 outputs the jobs generated by the component job generation unit 703 and the logical job generation unit 704 to the device determined by the output destination device determination unit 705.

FIG. 9 is a block diagram illustrating a relationship between a component job corresponding to each of the components illustrated in FIG. 1 and a logical job for producing the photobook 101. The component job is a job to be generated for each of the components, and includes a print job to be output to the image forming apparatus and a finishing job to be output to the post-processing apparatus. Component jobs 900 to 906 are generated for the respective components. The component jobs include the print jobs 900 to 903 and the finishing jobs 904 to 906. More specifically, the seven component jobs are generated to print the photobook 101. Thus, it is required that the jobs are efficiently output to the image forming apparatus and the post-processing apparatus.

According to the present exemplary embodiment, after all of the component jobs are generated, and the logical job 907 is generated by the information processing apparatus (management server 403) according to the present exemplary embodiment. The logical job 907 means a job obtained by collecting all component jobs for producing one product. According to the present exemplary embodiment, in the example illustrated in FIG. 1, the logical job 907 is generated to produce the photobook 101, and includes the print jobs 900 to 903, the case binding job 904, and the cut and crease jobs 905 and 906. FIG. 10 is a diagram illustrating an example of the component job according to the present exemplary embodiment. FIG. 10 is an example including the print job 900 of the text, the case binding job 904, and the cut and crease job 905 illustrated in FIG. 9, for describing details of the component job.

The print job 900 includes job detail information 1000 to 1004. A print setting for a print job is described in the job detail information 1000. The print setting may directly be described in the print job 900, or a Uniform Resource Locator (URL) for referring to a file including the print setting may be described therein. According to the present exemplary embodiment, the URL for referring to the file including the print setting is described in the job detail information 1000. The image forming apparatus executes printing processes 800 according to the print setting described in the job detail information 1000. The job detail information 1001 includes a job type, and "PrintingJob" indicating that the job type is a print job is described therein. The job detail information 1002 includes an output destination device name acquired by the output destination device acquisition unit 702, and "Image forming apparatus 404" is described therein as an example. The job detail information 1003 includes a model name of the output destination device acquired by the output destination device acquisition unit 702, and "On-demand printing machine" is described as an example. The job detail information 1004 includes a product number of the product. The product number is a value unique for each product issued by the component job generation unit 703 at job generation.

The case binding job 904 includes job detail information 1005 to 1008. The job detail information 1005 includes post-processing setting for a finishing job, and a URL for referring to a file including the post-processing setting is described therein. The job detail information 1006 includes a job type, and "FinishingJob" indicating that the job type is a finishing job is described therein. The job detail information 1007 and 1008 include an output destination device name and a model name, respectively. "Post-processing apparatus 406" is described as an output destination device in the job detail information 1007. "Binding machine" is described as a model name in the job detail information 1008. Job detail information 1009 includes a product number, similarly in the print job 900.

The cut and crease job 905 also has the similar structure as those of the print job 900 and the case binding job 904, previously described, and includes job detail information 1010 to 1014.

The format of readable setting information differs depending on the image forming apparatus and the post-processing apparatus. According to the present exemplary embodiment, the job output unit 706 converts the print setting described in the job detail information 1000, the post-processing setting described in the job detail information 1005, and the post-processing setting described in the job detail information 1010 into a format corresponding to the output destination device.

Figure 11:
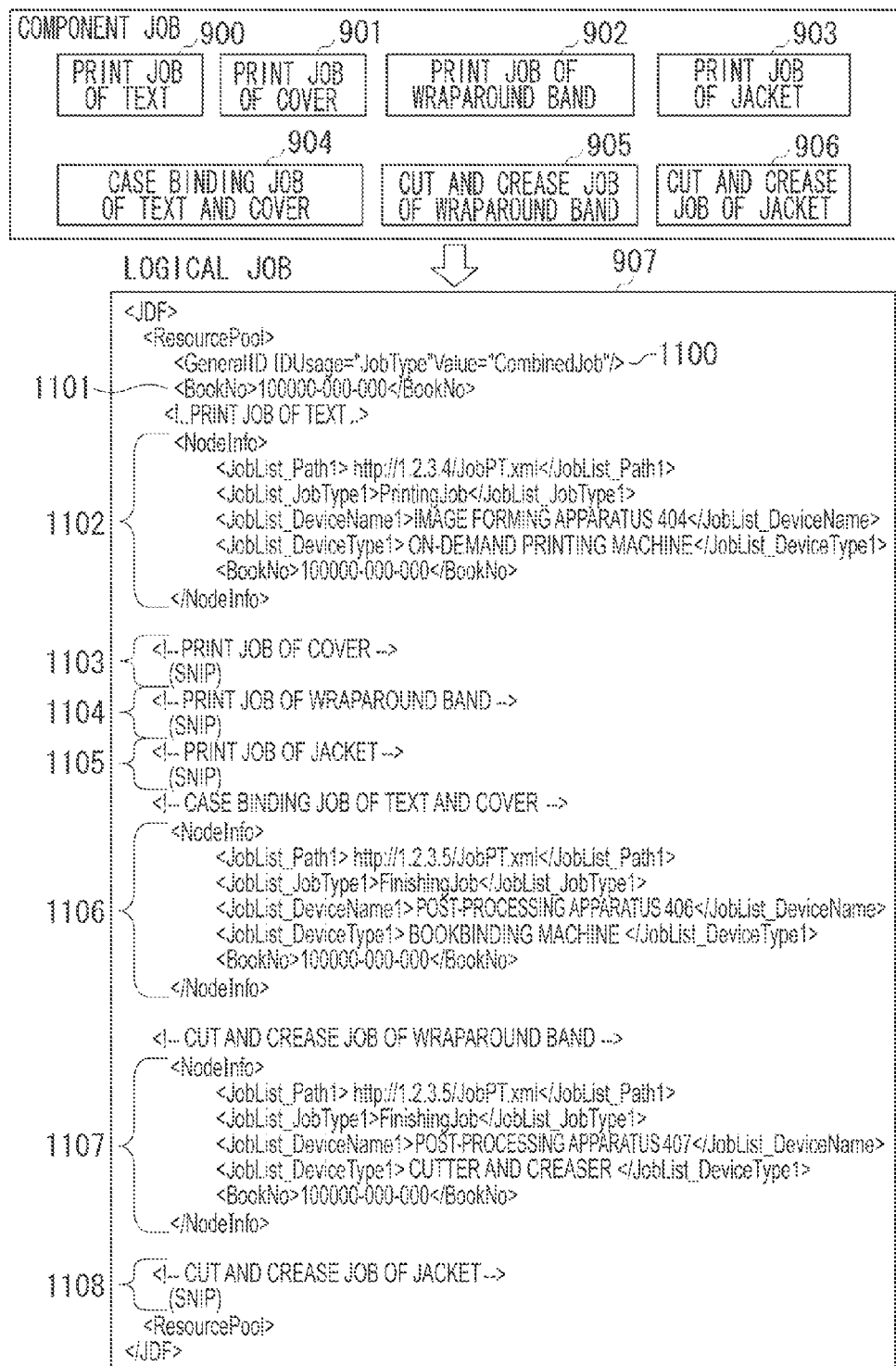
FIG. 11 is a diagram illustrating an example of a logical job.

FIG. 11 is a diagram illustrating an example of the logical job 907 according to the present exemplary embodiment. As described above, the logical job 907 is a job for producing one product. In the example illustrated in FIG. 1, the logical job 907 is a job for producing the photobook 101, which is the product. The logical job 907 is a job obtained by collecting the component jobs forming one product. Thus, the component jobs 900 to 906 for producing the photobook 101 are collected in the logical job 907. For example, the logical job 907 includes the job detail information 1000 to 1004 of the print job 900 as a first block 1102. Similarly, blocks 1103 to 1108 are job detail information of the component jobs 901 to 906, respectively. A job type 1100 is used for specifying that the job is a logical job, and "CombinedJob" indicating that the job is a logical job is described. A product number 1101 is generated by the uploaded data processing unit 700, and a value unique for each product is described therein.

Figure 12:
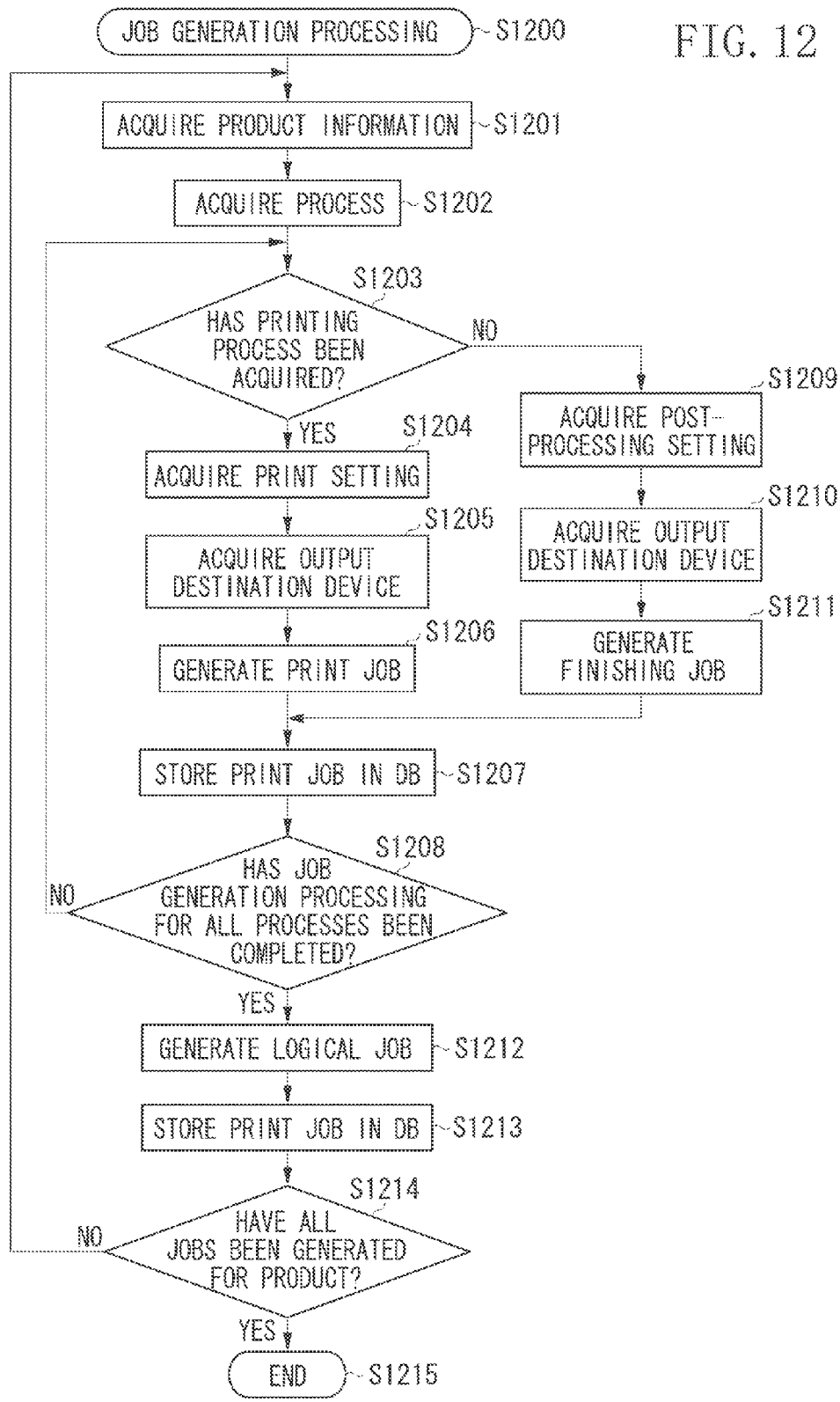
FIG. 12 is a flowchart illustrating job generation processing.

FIG. 12 illustrates a flow chart of job generation processing according to the present exemplary embodiment. In the work flow management software 501 illustrated in FIG. 7, the uploaded data processing unit 700 generates jobs for all the product and the component included in the order registered in the database 502. However, the product and the component, for which the jobs have already been generated, do not become a job generation processing target. The job generation processing is applied to the product and the component for which the jobs have not yet been generated.

In step S1200, the work flow management software 501 starts the job generation processing.

In step S1201, the component job generation unit 703 acquires product information from the database 502 for a product which is the job generation processing target. The product information means the product information 303 in which the product number, the product type number, and the product name illustrated in FIG. 3 are described, for example.

In step S1202, the component job generation unit 703 acquires processes set in the product, e.g., the printing process and the post-processing process illustrated in FIG. 8, based on a product type number for specifying the product type included in the product information.

In steps S1203 to S1208, the component job generation unit 703 generates component jobs for all the processes that have been acquired in step S1202. More specifically, in step S1203, the component job generation unit 703 determines whether the process is the printing process or post-processing process. If the process is the printing process (YES in step S1203), the processing proceeds to step S1204. If the process is the post-processing process (NO in step S1203), the processing proceeds to step S1209.

In step S1204, the component job generation unit 703 acquires the print setting associated with the printing process. As described above, in the work flow management software 501, the process is defined for each product type, and the print setting or the post-processing setting is stored while being associated with each of the processes. In the example illustrated in FIG. 8, the print setting is stored while being associated with each of the printing processes 801 to 804 of the text, the cover, the wraparound band, and the jacket in the printing process 800. Thus, the component job generation unit 703 acquires the print setting for each of the processes.

In step S1205, the component job generation unit 703 acquires an output destination device name and a model name which are previously acquired and stored in the database 502 by the output destination device acquisition unit 702 for executing the printing process. In the example illustrated in FIG. 8, the four printing processes 801 to 804 are included. Thus, output device names and model names for the four printing processes 801 to 804 are acquired.

In step S1206, the component job generation unit 703 generates a print job based on the print setting acquired in step S1204 and the output destination device name and the model name acquired in step S1205. The print job 900 illustrated in FIG. 10 is an example of the print job. In this case, the component job generation unit 703 may store the print setting acquired in step S1204 in the database 502 and describe a path indicating a place where the print setting is stored in the print job.

In step S1207, the component job generation unit 703 stores the generated component job, e.g., the print job for the text in the database 502.

The component job generation unit 703 also performs job generation processing for the post-processing process, similarly for the printing process. More specifically, in step S1208, the component job generation unit 703 determines whether the job generation processing has been completed for all the processes. If the job generation processing for the post-processing process has not been completed (NO in step S1208), the processing proceeds to step S1203 and S1209.

In step S1209, the component job generation unit 703 acquires the post-processing setting associated with the post processing process. As described in step S1204, in the work flow management software 501, the process is defined for each product type, and the post-processing setting is stored while being associated with each of the processes. In the example illustrated in FIG. 8, the post-processing setting is stored while being associated with each of the three post-processing processes 806 to 808. Thus, the component job generation unit 703 acquires the post-processing settings.

In step S1210, the component job generation unit 703 acquires an output destination device name and a model name which are previously acquired and stored in the database 502 by the output destination device acquisition unit 702 for executing the post-processing process stored in the database 502. In the example illustrated in FIG. 8, the three post-processing processes 806 to 808 are included. Thus, output device names and model names for the three post-processing processes 806 to 808 are acquired.

In step S1211, the component job generation unit 703 generates a finishing job based on the post-processing setting that has been acquired in step S1209 and the output destination device name and the model name that have been acquired in step S1210. The case binding job 904 and the cut and crease job 905 illustrated in FIG. 10 are the examples of the finishing job. In this case, the component job generation unit 703 may store the post-processing setting acquired in step S1209 in the database 502 and describe a path indicating a place where the post-processing setting is stored in the finishing job.

After the generation of the component jobs 900 to 907 has been completed for all the processes, the work flow management software 501 generates a logical job.

In step S1212, the logical job generation unit 704 acquires the component jobs 900 to 906 stored in the database 502 and job detail information of the component jobs, and generates the logical job. The logical job 907 illustrated in FIG. 11 is the specific example of the logical job.

In step S1213, the logical job generation unit 704 stores the generated logical job in the database 502.

In step S1214, the work flow management software 501 determines whether all the jobs have been generated for the product. Unless all the jobs have been generated for the product (NO in step S1214), the processing proceeds to step S1201. If all the jobs have been generated for the product (YES in step S1214), the processing proceeds to step S1215. In step S1215, the job generation processing ends.

The job generation processing flow according to the present exemplary embodiment is then completed.

Figure 13:
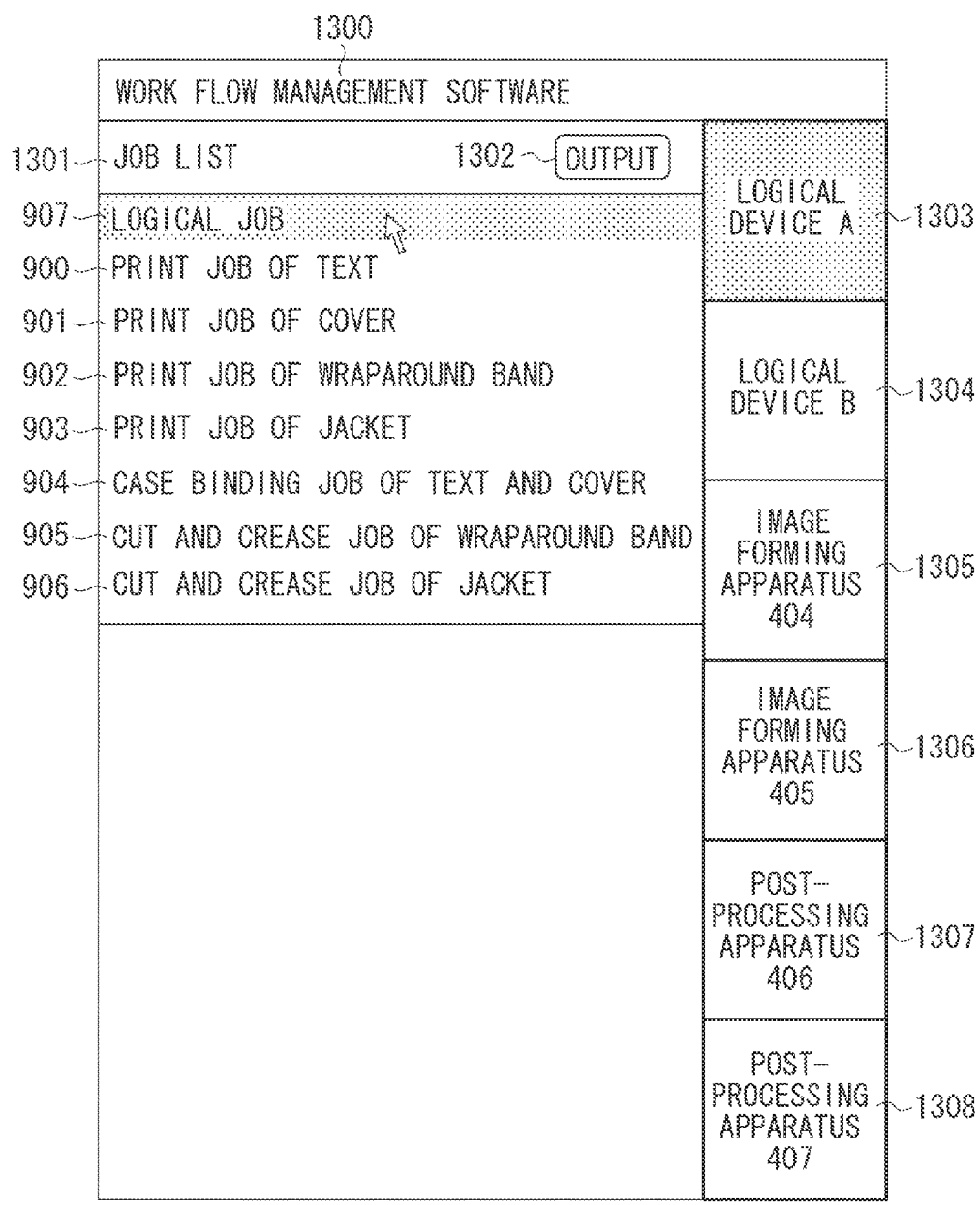
FIG. 13 is a diagram illustrating an example of a screen of work flow management software.

FIG. 13 is a diagram illustrating an example of a screen of the work flow management software 501 according to the present exemplary embodiment.

According to the present exemplary embodiment, the screen of the work flow management software 501 is roughly divided into four parts. The first part is a title bar 1300 of the work flow management software 501. The second part is a job list 1301 for displaying jobs managed by the work flow management software 501. According to the present exemplary embodiment, the logical job 907 and the component jobs 900 to 906 are displayed in the job list 1301. The third part includes output destination devices 1303 to 1308. The output destination devices 1303 to 1308 can also be displayed as icons (objects), or may be listed in a text format. According to the present exemplary embodiment, the output destination devices are displayed on the screen using the icons. The fourth part is an output button 1302. When the output button 1302 is pressed, the job selected in the job list 1301 is output to the output destination device.

According to the present exemplary embodiment, a logical device A, a logical device B, the image forming apparatus 404, image forming apparatus 405, the post-processing apparatus 406, and the post-processing apparatus 407 are respectively prepared as the output destination devices 1303, 1304, 1305, 1306, 1307, and 1308. The logical device does not referred to a device physically existing but a representation of a group of physical devices. Alternatively, the logical device is used for outputting the job to a device described in an output target job. On the other hand, the icons 1305 to 1308 are physical devices, such as the image forming apparatus 404 and the post-processing apparatus 406.

FIG. 14 is a diagram illustrating an example of an output destination device setting file 1400 according to the present exemplary embodiment. According to the present exemplary embodiment, the output destination device setting file 1400 is represented in an Extensible Markup Language (XML) format, and has already been set when the work flow management software 501 is installed.

The output destination device setting file 1400 can be roughly divided into two parts. The first part is a logical device definition list 1401, and the second part is a physical device definition list 1406.

According to the present exemplary embodiment, the logical device definition list 1401 includes logical device definition information 1402 and 1403 each defining a name of a logical device and physical devices forming the logical device. As illustrated in the logical device definition information 1402, only a logical device name may be described. As illustrated in the logical device definition information 1403, physical device designation information 1404 and 1405 may be described just below the logical device definition information 1403. The logical device names described in the logical device definition information 1402 and 1403 are displayed on the screen of the work flow management software 501. An output destination device name and a model name are described in each of the physical device designation information 1404 and 1405.

According to the present exemplary embodiment, the physical device definition list 1406 includes physical device definition information 1407 to 1410. An output destination device name and a model name are described in each of the physical device definition information 1407 to 1410.

Figures 15, 15A:
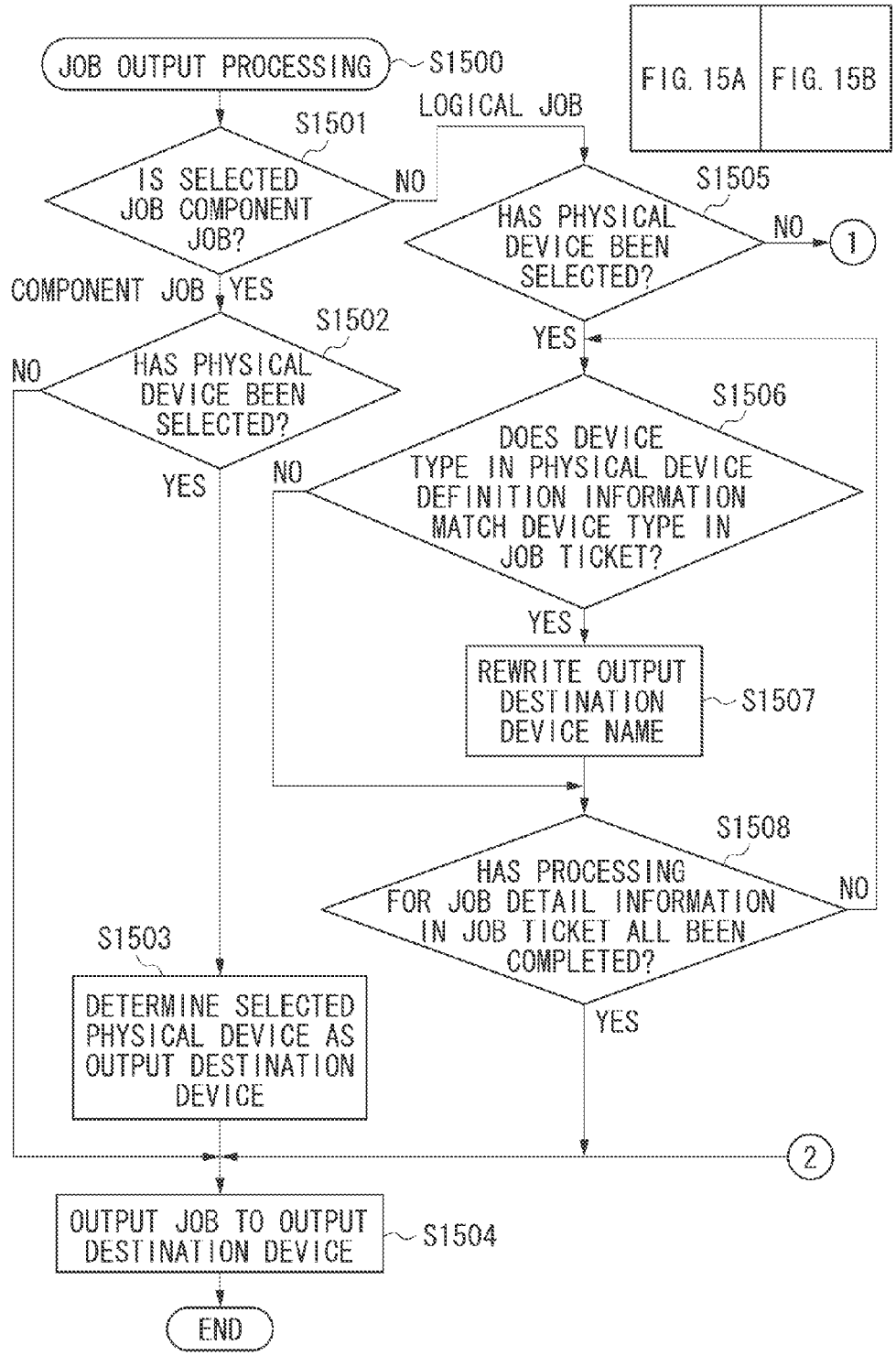
FIG. 15 is a diagram including the flowcharts of FIGS. 15A and 15B.
FIGS. 15A and 15B are flowcharts illustrating job output processing.
Figure 15B:
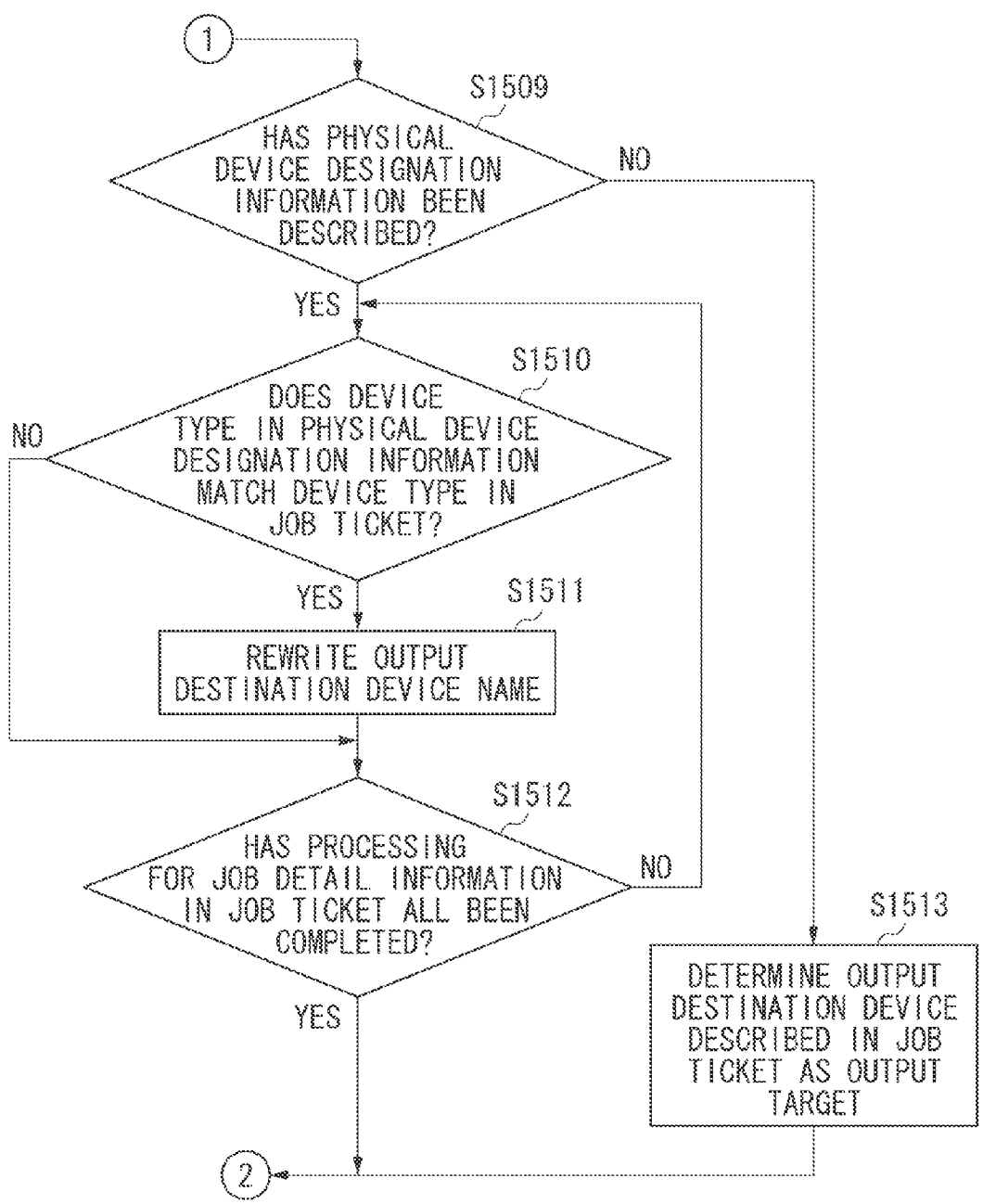

FIG. 15 is a flow chart illustrating job output processing according to the present exemplary embodiment. When the output button 1302 is pressed on the screen of the work flow management software 501 illustrated in FIG. 13, the job output processing is performed. The job output processing will be described below based on a specific screen operation with reference to FIG. 13 and FIGS. 16 to 21.

In step S1500, the job output unit 706 starts the job output processing at the time point where the output button 1302 is pressed on the screen of the work flow management software 501.

A case where an instruction to output the logical job 907 to the logical device A 1303 is issued will be described with reference to FIGS. 11, 13, and 14.

In step S1501, the job output unit 706 determines whether a selected job is a component job. In an example illustrated in FIG. 13, the logical job 907 is selected in the job list 1301. Thus, the job output unit 706 receives the logical job 907. The job output unit 706 refers to the job type 1100 in the logical job 907 and specifies that the selected job is a logical job (NO in step S1501), and the processing proceeds to step S1505.

In step S1505, the output destination device determination unit 705 determines whether a physical device is selected. For example, in the example illustrated in FIG. 13, the logical device A 1303 is selected. At this time, the output destination device determination unit 705 refers to the output destination device setting file 1400, and searches the output destination device setting file 1400 for a device name "logical device A" of the selected logical device A 1303. As a result, the device name of the selected logical device A 1303 and the logical device name described in the logical device definition information 1402 are both "logical device A", thereby match each other. Thus, the output destination device determination unit 705 determines that a logical device has been selected (NO in step S1505), and the processing proceeds to step S1509.

In step S1509, the output destination device determination unit 705 refers to the logical device definition information 1402 for the selected logical device A 1303, and determines whether physical device designation information is described. The physical device designation information is not described for the logical device A 1303 in the physical device definition information 1402 illustrated in FIG. 14 (NO in step S1509), and thus the processing proceeds to step S1513.

In step S1513, the output destination device determination unit 705 determines output destination devices of which names are described in the job detail information 1102-1108 in the logical job 907 as output targets.

In step S1504, the job output unit 706 outputs the job to the output destination devices determined by the output destination device determination unit 705 in step S1513. In the example illustrated in FIG. 13, the logical job 907 is selected as an output target. Thus, the print jobs 900 to 903, the case binding job 904, and the cut and crease jobs 905 and 906, which area included in the logical job 907, are respectively output to the image forming apparatus 404, the post-processing apparatus 406, and the post-processing apparatus 407.

Processing performed in a case where the instruction to output the logical job 907 to the logical device A 1303 is issued is completed.

Figure 16:
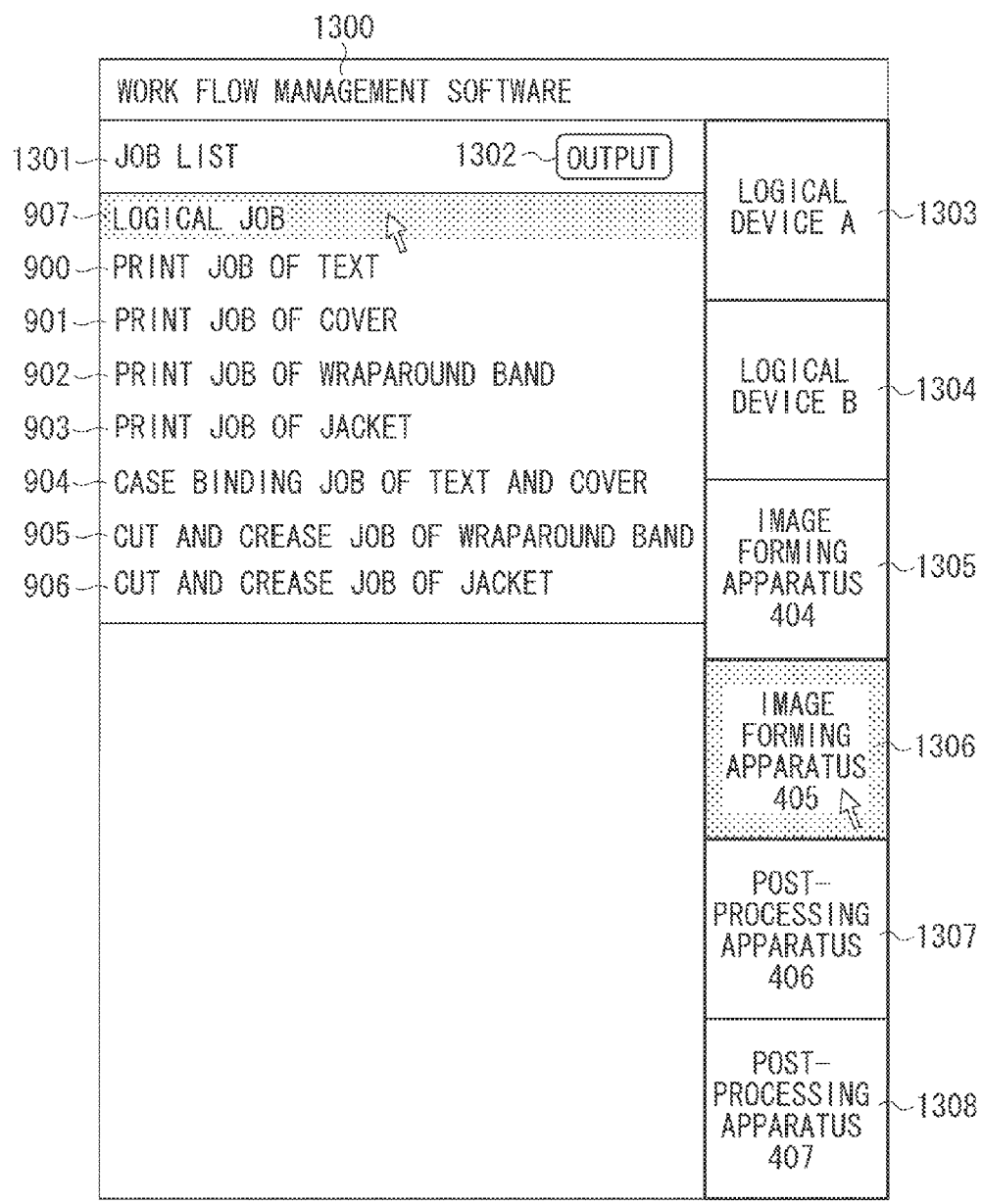
FIG. 16 is a diagram illustrating an example of a screen of work flow management software.

A case where an instruction to output the logical job 907 to the physical device 1306 is issued will be described with reference to FIGS. 11, 14, and 16. As a use case where an instruction to output a logical job to a physical device is issued, suppose that a device assigned at the time point where a production schedule is generated is in a bad condition, and thus the logical job is desired to be output to another device.

In step S1501, the job output unit 706 determines whether a selected job is a component job. In an example illustrated in FIG. 16, the logical job 907 is selected in the job list 1301. Thus, the job output unit 706 receives the logical job 907. The job output unit 706 refers to the job type 1100 in the logical job 907 and specifies that the selected job is a logical job (NO in step S1501), and the processing proceeds to step S1505.

In step S1505, the output destination device determination unit 705 determines whether a physical device has been selected. In the example illustrated in FIG. 16, the physical device 1306 is selected. At this time, the output destination device determination unit 705 refers to the output destination device setting file 1400, and searches the output destination device setting file 1400 for a device name "image forming apparatus 405" of the selected physical device 1306. The device name of the selected physical device 1306 and a physical device name described in the physical device definition information 1408 are both "image forming apparatus 405", and thereby match each other.

As a result, the output destination device determination unit 705 determines that the physical device is selected (YES in step S1505), and the processing proceeds to step S1506.

In step S1506, the output destination device determination unit 705 determines whether a device type "on-demand printing machine" described in the physical device definition information 1408 matches a device type in the job detail information included in the logical job 907. In an example illustrated in FIG. 11, device types described in the job detail information 1102 to 1105 match the device type "on-demand printing machine" described in the physical device definition information 1408 (YES in step S1506), and thus the processing proceeds to step S1507. Device types described in the job detail information 1106 to 1108 do not match the device type "on-demand printing machine" described in the physical device definition information 1408 (NO in step S1506), and thus the processing proceeds to step S1508.

In step S1507, the output destination device determination unit 705 rewrites output destination device names in the job detail information 1102 to 1105 of which device types match the device type "on-demand printing machine" described in the physical device definition information 1408 to the device name "image forming apparatus 405" in the physical device definition information 1408.

In step S1508, the output destination device determination unit 705 determines whether processing for the job detail information in a job ticket has all been completed. If the processing has all been completed (YES in step S1508), the processing proceeds to step S1504. If the processing has not all been completed (NO in step S1508), the processing proceeds to step S1506.

In step S1504, the job output unit 706 outputs the job to the output destination device determined by the output destination device determination unit 705 in step S1507. In the example illustrated in FIG. 16, the logical job 907 has been selected as an output target. Thus, the print jobs 900 to 903, the case binding job 904, and the cut and crease jobs 905 and 906, which are included in the logical job 907, are respectively output to the image forming apparatus 405, the post-processing apparatus 406, and the post-processing apparatus 407.

Processing performed in a case where the instruction to output the logical job 907 to the physical device 1306 is issued is completed.

A case where an instruction to output the logical job 907 to the logical device B 1304 is issued will be described with reference to FIGS. 11, 14, and 17. In an example illustrated in FIG. 14, for the logical device B 1304, the physical device designation information 1404 and 1405 are described for the logical device definition information 1403 in the output destination device setting file 1400. In the physical device designation information 1404, "image forming apparatus 405" and "on-demand printing machine" are respectively defined as an output destination device name and a model name. In the physical device designation information 1405, the "post-processing apparatus 406" and the "binding machine" are respectively defined as an output destination device and a model name.

Figure 17:
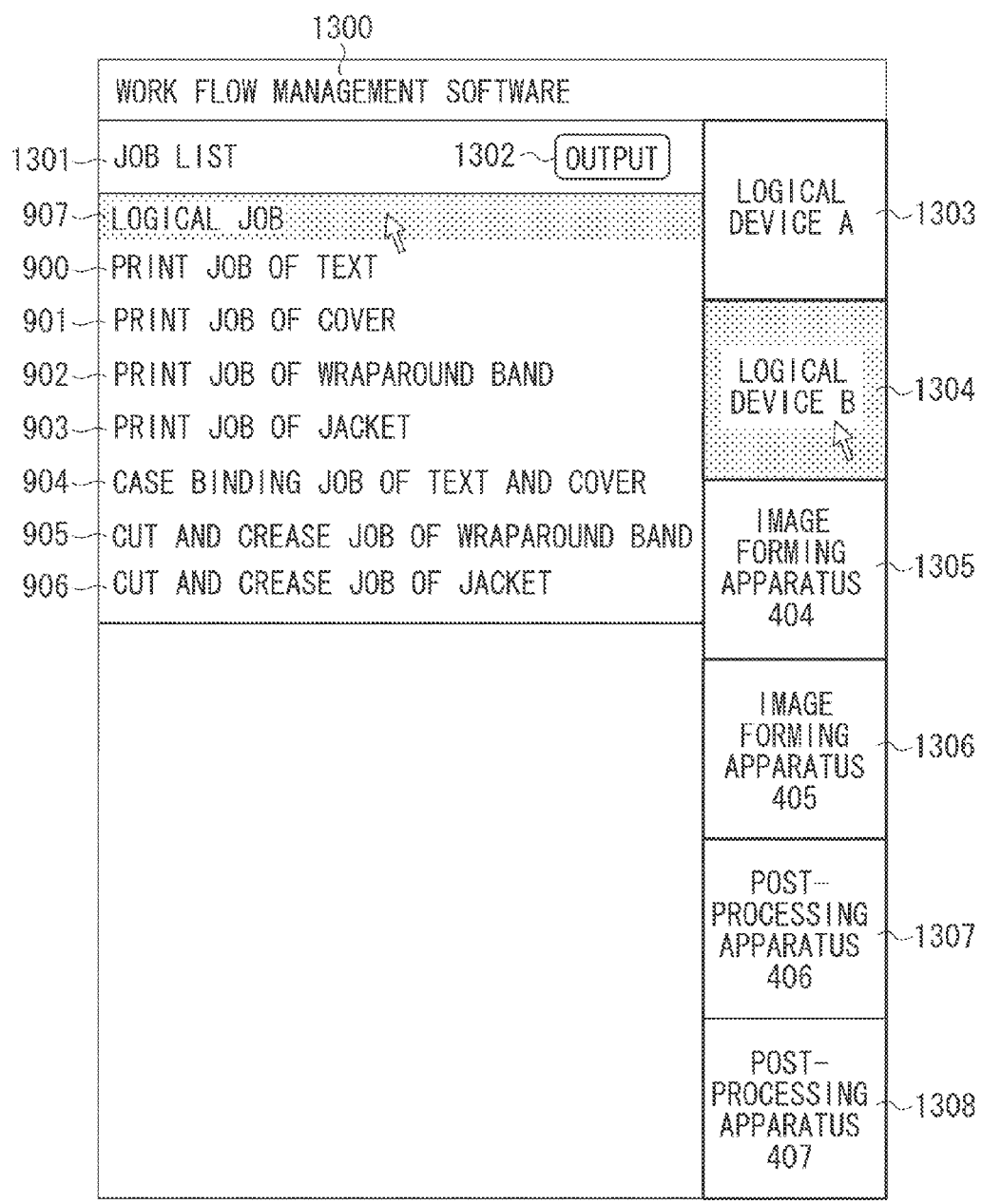
FIG. 17 is a diagram illustrating an example of a screen of work flow management software.

In an example illustrated in FIG. 17, in step S1509, the output destination device determination unit 705 refers to the logical device definition information 1403 for the selected logical device B 1304, and determines whether the physical device designation information is described. The physical device designation information is described for the logical device B 1304 in the logical device definition information 1403 illustrated in FIG. 14 (YES in step S1509), and thus the processing proceeds to step S1510.

In step S1510, the output destination device determination unit 705 determines whether a device type "on-demand printing machine" described in the physical device designation information 1404 matches the device type in the job detail information described in the logical job 907. In the example illustrated in FIG. 11, the device types in the job detail information 1102 to 1105 match the device type "on-demand printing machine" described in the physical device designation information 1404 (YES in step S1510), and thus the processing proceeds to step S1511. The device types described in the job detail information 1106 to 1108 do not match the device type "on-demand printing machine" in the physical device designation information 1404 (NO in step S1510), and thus the processing proceeds to step S1512.

In step S1510, the output destination device determination unit 705 determines whether a device type "binding machine" described in the physical device designation information 1405 matches the device type in the job detail information included described in the logical job 907. In the example illustrated in FIG. 11, the device type in the job detail information 1106 matches the device type "booking machine" described in the physical device designation information 1405 (YES in step S1510), and thus the processing proceeds to step S1511.

In step S1511, the output destination device determination unit 705 rewrites the output destination device names described in the job detail information 1102 to 1105 of which device types match the device type described in the physical device designation information 1404 to the device name "image forming apparatus 405" described in the physical device designation information 1404. The output destination device determination unit 705 rewrites the output destination device name described in the job detail information 1106 of which device type matches the device type described in the physical device designation information 1405 to the device name "post-processing apparatus 406" described in the physical device designation information 1405.

In step S1512, the output destination device determination unit 705 determines whether processing for the job detail information in a job ticket has all been completed. If the processing has all been completed (YES in step S1512), the processing proceeds to step S1504. If the processing has not all been completed (NO in step S1512), the processing proceeds to step S1510.

In step S1504, the job output unit 706 outputs the job to the output destination device determined by the output destination device determination unit 705 in step S1511. In the example illustrated in FIG. 13, the logical job 907 has been selected as an output target. Thus, the print jobs 900 to 903, the case binding job 904, and the cut and crease jobs 905 and 906, which are included in the logical job 907, are respectively output to the image forming apparatus 405, the post-processing apparatus 406, and the post-processing apparatus 407.

Processing performed in case where the instruction to output the logical job 907 to the logical device B 1304 is issued is completed.

Figure 18:
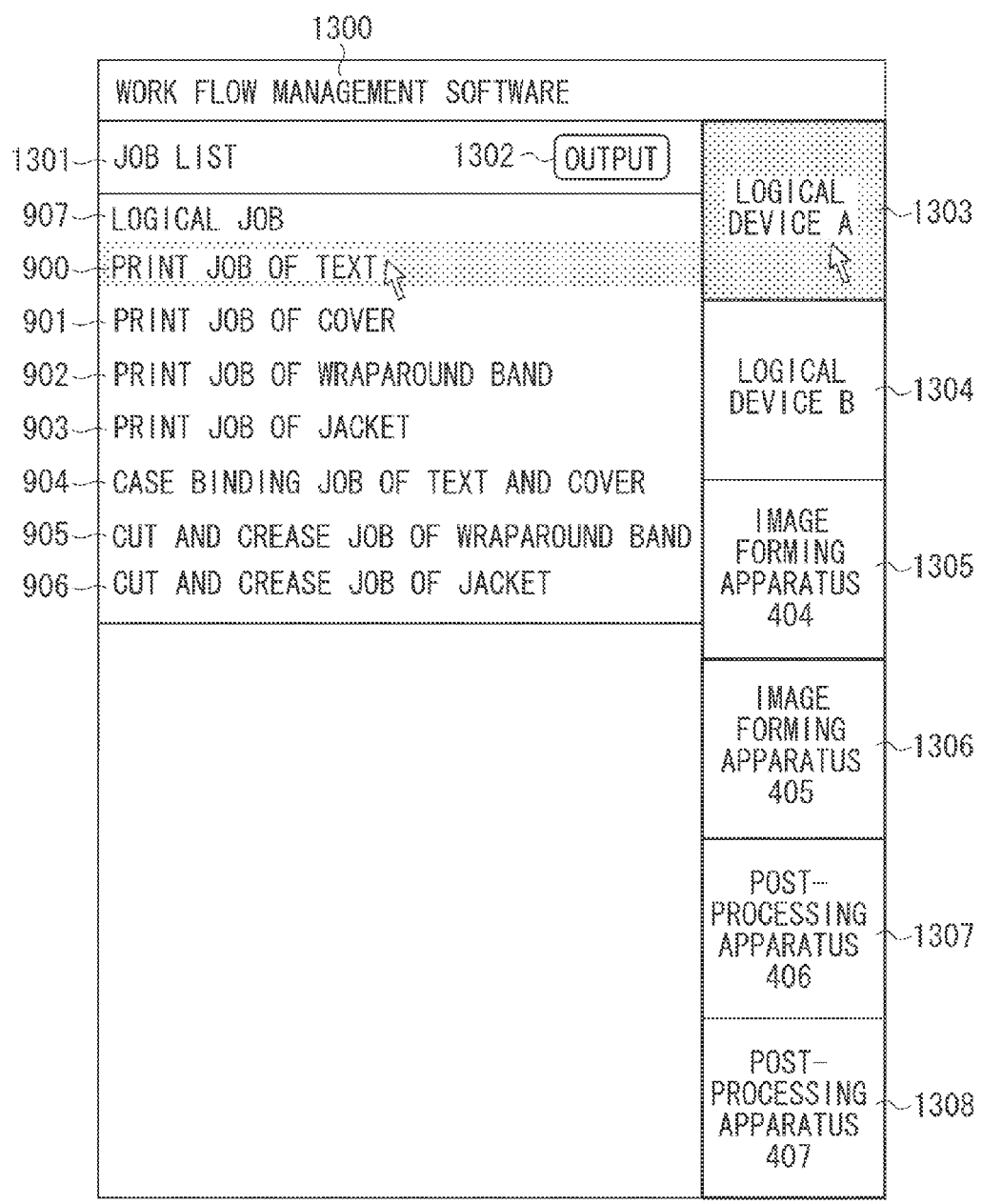
FIG. 18 is a diagram illustrating an example of a screen of work flow management software.

As illustrated in FIG. 18, when an instruction to output a component job (a print job 900 in an example illustrated in FIG. 18) to a logical device A 1303 is issued, in step S1501, the job output unit 706 determines whether a selected job is a component job. In the example illustrated in FIG. 18, the print job 900 is selected in the job list 1301. Thus, the job output unit 706 receives the print job 900. The job output unit 706 refers to the job type 1001 in the print job 900 and specifies that the selected job is a print job, i.e., a component job (YES in step S1501), and the processing proceeds to step S1502.

In step S1502, the output destination device determination unit 705 determines whether a physical device has been selected, similarly in step S1505. In the example illustrated in FIG. 18, the logical device A 1303 is selected. Thus, it is determined that the physical device is not selected (NO in step S1502), and the processing proceeds to step S1504. In step S1504, the job output unit 706 outputs the print job 900 to the image forming apparatus 404 described in the print job 900.

Figure 19:
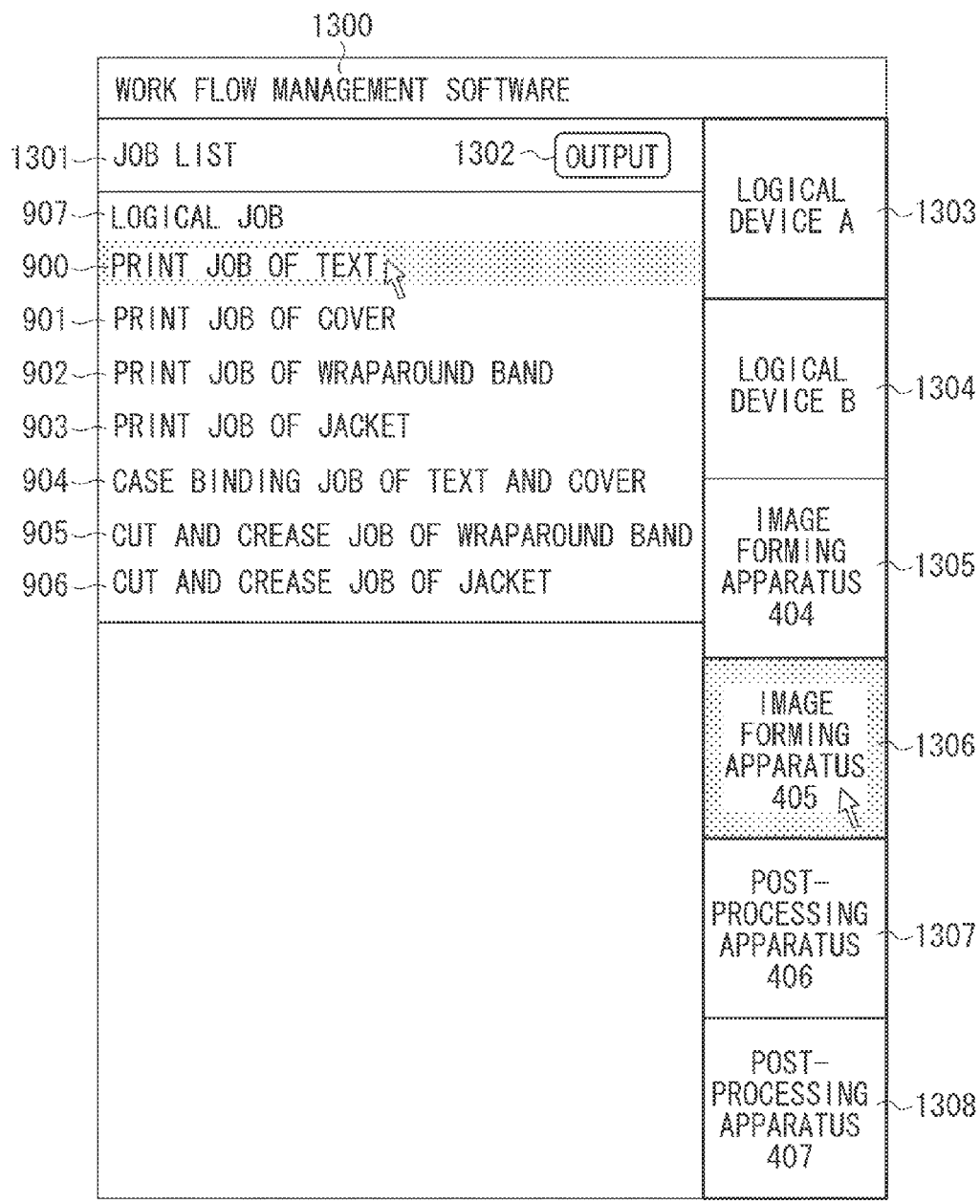
FIG. 19 is a diagram illustrating an example of a screen of work flow management software.

As illustrated in FIG. 19, in a case where an instruction to output the print job 900 to the physical device 1306 is issued, in step S1502, the output destination device determination unit 705 determines whether a physical device is selected, similarly in step S1505. In an example illustrated in FIG. 19, the physical device 1306 is selected. Thus, it is determined that the physical device is selected (YES in step S1502), and the processing proceeds to step S1503.

In step S1503, the output destination device determination unit 705 determines the selected physical device 1306 as an output destination device, and rewrites the device name 1002 in the print job 900 to the device name "image forming apparatus 405".

If a model name of a selected device and a model name described in a job differ from each other, it is determined that an error occurred. The output destination device determination unit 705 performs processing for displaying an error message on a screen.

The processing for job output then ends.

Thus, according to the present exemplary embodiment, in a case where one or more devices are used, and if an order of a product including one or more components is produced in large numbers in a day, the number of jobs increases. However, a worker may perform an output operation using a logical job. More specifically, a load on an operation for selecting a plurality of devices to print a plurality of components is reduced by handling a logical job for producing one product.

According to the above-described exemplary embodiment, one logical job generated by collecting component jobs corresponding to each of the plurality of components is generated, and an operator can issue an instruction to output the plurality of components using the one logical job. Thus, operability is improved.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-255209 filed Dec. 10, 2013, which is hereby incorporated by reference herein in its entirety.

What is claimed is:

1. An information processing apparatus comprising:
   a first display controlling unit configured to display a composite job object, a print job object, and a post-processing job object as candidates for a to-be-outputted job in a first display area,
   the composite job object representing a composite job, the composite job including a print job and a post-processing job for forming a product,
   the print job object representing the print job for forming the product, and
   the post-processing job object representing the post-processing job for forming the product;
   a second display controlling unit configured to display a logical device object, a printing apparatus object, and a post-processing apparatus object as candidates for an output destination device in a second display area,
   the logical device object representing a logical device to which the printing apparatus and the post-processing apparatus are assigned,
   the printing apparatus object being an object of the printing apparatus, and
   the post-processing apparatus object being an object of the post-processing apparatus; and
   a transmitting unit configured to transmit the print job included in the composite job to the printing apparatus and the post-processing job included in the composite job to the post-processing apparatus in a case where the composite job object displayed in the first display area is selected and where the logical device object displayed in the second display area is selected, and transmit the print job to the printing apparatus in a case where the print job object displayed in the first display area is selected and where the printing apparatus object displayed in the second display area is selected.

2. The information processing apparatus according to claim 1,
   wherein the second display controlling unit further displays an object not being assigned to an output device in the second display area.

3. The information processing apparatus according to claim 2,
   wherein, in a case where the composite job object displayed in the first display area is selected and where the object not being assigned to the output device and displayed in the second display area is selected, the job is transmitted to an output device designated in the composite job.

4. The information processing apparatus according to claim 1, further comprising:
   a first selection unit configured to select one of the composite job object, the print job object, and the post-processing job object displayed in the first display area as the to-be-outputted job,
   the composite job object representing the composite job, the composite job including the print job and the post-processing job for forming the product,
   the print job object representing the print job for forming the product, and
   the post-processing job object representing the post-processing job for forming the product; and
   a second selection unit configured to select one of the logical device object, the printing apparatus object, and the post-processing apparatus object displayed in the second display area as the output destination device,
   the logical device object representing the logical device to which the printing apparatus and the post-processing apparatus are assigned,
   the printing apparatus object being the object of the printing apparatus, and
   the post-processing apparatus object being the object of the post-processing apparatus.

5. The information processing apparatus according to claim 4,
   wherein, in a case where the post-processing job object displayed in the first display area is selected and where the post-processing apparatus object displayed in the second display area is selected, the post-processing job is transmitted to the post-processing apparatus.

6. An information processing method comprising:
   displaying a composite job object, a print job object, and a post-processing job object as candidates for a to-be-outputted job in a first display area, the composite job object representing a composite job, the composite job including a print job and a post-processing job for forming a product, the print job object representing the print job for forming the product, and the post-processing job object representing the post-processing job for forming the product;

displaying a logical device object, a printing apparatus object, and a post-processing apparatus object as candidates for an output destination device in a second display area, the logical device object representing a logical device to which the printing apparatus and the post-processing apparatus are assigned, the printing apparatus object being an object of the printing apparatus, and the post-processing apparatus object being an object of the post-processing apparatus;

in a case where the composite job object displayed in the first display area is selected and where the logical device object displayed in the second display area is selected, transmitting the print job included in the composite job to the printing apparatus and the post-processing job included in the composite job to the post-processing apparatus; and in a case where the print job object displayed in the first display area is selected and where the printing apparatus object displayed in the second display area is selected, transmitting the print job to the printing apparatus.

7. The information processing method according to claim 6, further comprising:

displaying an object not being assigned to an output device in the second display area.

8. The information processing method according to claim 7, wherein, in a case where the composite job object displayed in the first display area is selected and where the object not being assigned to the output device and displayed in the second display area is selected, the job is transmitted to an output device designated in the composite job.

9. A non-transitory computer-readable recording medium storing a program for causing a computer to perform an information processing method comprising the steps of:

displaying a composite job object, a print job object, and a post-processing job object as candidates for a to-be-outputted job in a first display area, the composite job object representing a composite job, the composite job including a print job and a post-processing job for forming a product, the print job object representing the print job for forming the product, and the post-processing job object representing the post-processing job for forming the product;

displaying a logical device object, a printing apparatus object, and a post-processing apparatus object as candidates for an output destination device in a second display area, the logical device object representing a logical device to which the printing apparatus and the post-processing apparatus are assigned, the printing apparatus object being an object of the printing apparatus, and the post-processing apparatus object being an object of the post-processing apparatus;

in a case where the composite job object displayed in the first display area is selected and where the logical device object displayed in the second display area is selected, transmitting the print job included in the composite job to the printing apparatus and the post-processing job included in the composite job to the post-processing apparatus; and in a case where the print job object displayed in the first display area is selected and where the printing apparatus object displayed in the second display area is selected, transmitting the print job to the printing apparatus.

* * * * *